UNITED STATES PATENT OFFICE.

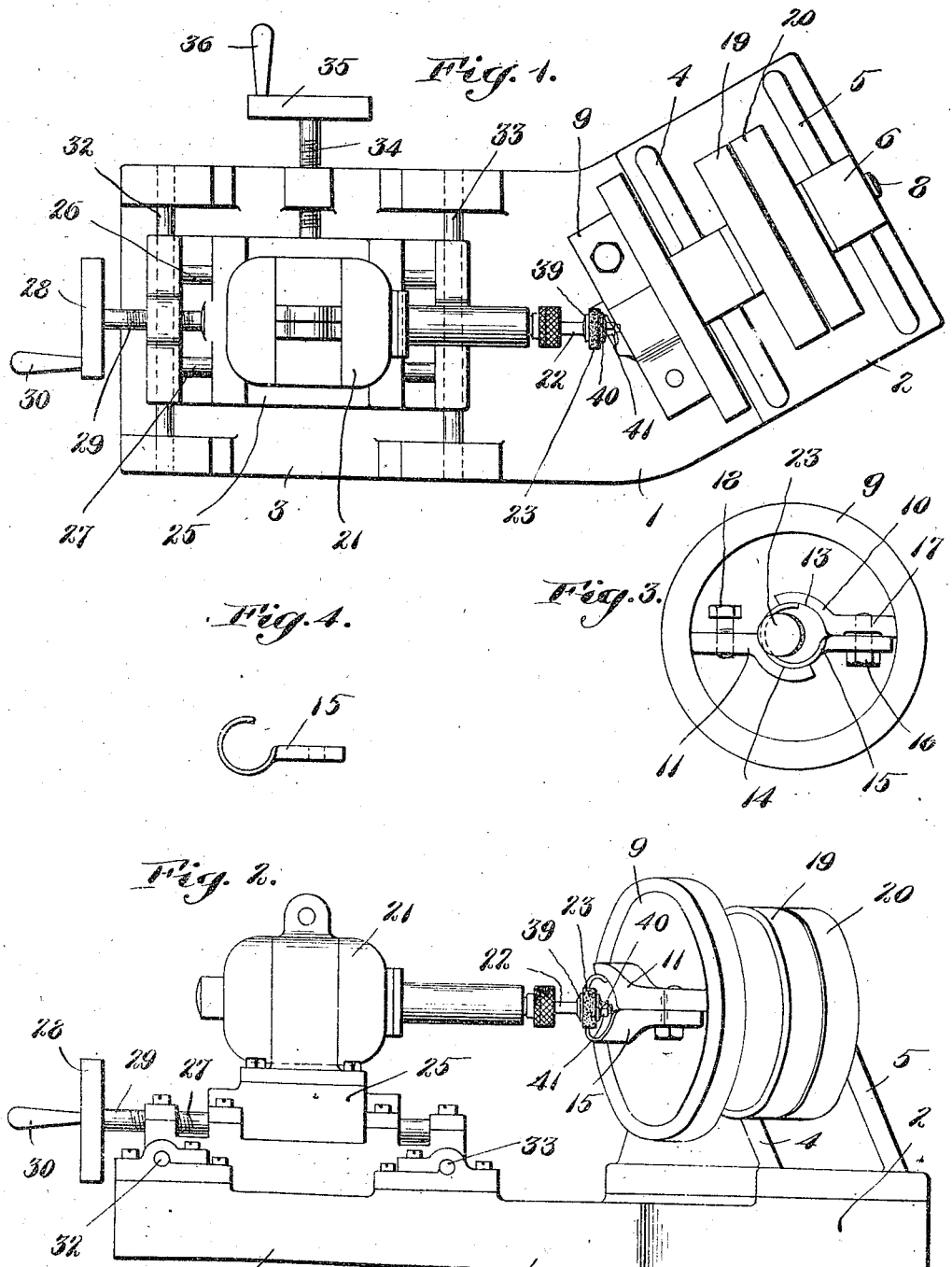

FRED H. LINDSAY, OF CAMPELLO, MASSACHUSETTS, ASSIGNOR OF ONE-HALF TO ELLERY C. WRIGHT, DOING BUSINESS UNDER THE FIRM NAME AND STYLE OF WOODWARD & WRIGHT LAST COMPANY, OF BROCKTON, MASSACHUSETTS.

KNIFE-GRINDING MACHINE.

1,296,979.   Specification of Letters Patent.   Patented Mar. 11, 1919.

Application filed November 23, 1917. Serial No. 203,505.

*To all whom it may concern:*

Be it known that I, FRED H. LINDSAY, a citizen of the United States, and resident of Campello, in the county of Plymouth and State of Massachusetts, have invented an Improvement in Knife-Grinding Machines, of which the following description, in connection with the accompanying drawings, is a specification, like letters on the drawings representing like parts.

My present invention is an improved grinding machine intended particularly for forming a cutting edge on the curved cutting portions of certain kinds of tools. The machine is especially valuable for use in grinding the cutting edge on curved tools used in turning lathes, such for example, as those employed in the manufacture of uneven formed articles, such as boot and shoe lasts. In the tools used in such lathes, a curved cutting portion operates on the stock and it is of great importance to have the cutting edge true, and parallel with the rear or back edge. Heretofore it has been extremely difficult to sharpen, grind and true the cutting edge portion of such tools because this work was done by hand, and because of the difficulty of grinding on the inner part of the curved tool and forming the bevel around said curved cutting edge.

A further important feature of my present machine is, that having determined, by long experience and exhaustive tests just the angle or bevel for greatest efficiency for the particular tool on the special work in hand, my machine will always produce this bevel. Thus, for example, in last turning lathes, it has been found that the correct bevel or clearance on the cutters to operate upon kiln dried rock maple, from which all lasts are made, is to have said bevel at an angle of 35°. Consequently for the grinding cutters for this work I arrange the apparatus so that it will always produce a 35° bevel and no carelessness of the operator will vary this result.

A further important feature of my present machine consists in the provision of automatic means which will prevent the holding of the grinding medium and the tool in one position too long, thus eliminating all danger of "burning" the steel as well as also eliminating the danger of gouging the cutter at any point. To accomplish this result, I mount the tool to be ground upon a constantly rotating work support, rotating said work support so that a new part of the knife is being constantly brought into engagement with the grinding medium, thus keeping the steel cool and permitting increased speed of the grinding medium without danger of injury to the cutter edge. This provision of a rotary work holder also, enables the machine to form exactly the same bevel completely around the curved portion of the cutter. Consequently in turning lasts or similar uneven contoured articles, the cutter knife will cut with uniform accuracy entirely around its curved contour. This is of the greatest importance in lathes, as the cutter is constantly in operation on different parts of the curved cutting surface, depending upon the contour of the work, and unless a true beveled edge entirely around the circumference of the curved portion is ground, the work will not be uniform.

My invention obviates all the difficulties heretofore experienced in grinding this type of curved edge tool and I provide a machine which will automatically and invariably produce the same bevel on the curved part of the cutter, grinding, truing and forming the edge of a cutter, accurately at the desired bevel, and also performing all subsequent grinding actions on successive tools, and successive grindings on the same tool, with exactly the same angle and accuracy.

My machine is simple, economical to build, and capable of use by unskilled labor. The grinding operation is also greatly expedited while adjustments to compensate for wear in the grinder allow relative movement between the grinding medium and work are provided.

In carrying out my present invention I prefer to utilize a supporting base or casting having a work holding member adapted to be rotated at relatively slow speed and with a rotatable spindle carrying the grinder adapted to be rotated at high speed, said work holder and grinder being angularly positioned, relatively with each other, which angle is the bevel desired to be formed on the edge of the cutter. In cutters used in last turning lathes, this bevel is approximately thirty degrees, and therefore to form such a bevel on the cutting edge of the tool, I arrange the axis of the work holder and the axis of the grinding medium at said thirty-five degree angle. I also prefer to have the grinder adapted to be quickly withdrawn from contact with the work and readily replaced, to facilitate removal and replacement of the cutter. I also provide work holding devices for the curved cutting tool so that the same will be held accurately, firmly and exactly in position for the grinding operation, as will be hereafter explained.

Referring to the drawings, illustrating a preferred embodiment of my grinder,

Figure 1 shows a plan view of the same;

Fig. 2 is a side view of my machine;

Fig. 3 is a fragmentary view of the work holder with a cutter knife in position and the cutting medium indicated in its relative position thereto; and Fig. 4 is a view of the curved cutting tool to be ground.

I have herein illustrated the machine as adapted for electrical operation, viz., the grinding medium is mounted on a spindle adapted to be rotated by a small electric motor with current supply cords leading to any suitable source of power, as an electrical socket adjacent the machine. It will be understood that other mechanism to rotate the grinder spindle could be employed if desired. I also have herein illustrated my machine as of a simple, compact, bench type of machine, wherein a standard or base 1 is formed with two arms, one arm 2 carrying the work-holding instrumentalities, and the other arm 3 being at an angle thereto of substantially thirty degrees and carrying and supporting the grinding devices and adjustments. On the portion 2 are mounted standards 4 and 5 having journal bearings 6 and 7 for the shaft 8. Mounted on the shaft 8 is a work-holding member in the form of a wheel 9 with lugs 11 and 10 cast on the face thereof. The inner surfaces of these lugs are rounded as shown at 13 and 14, being preferably in a curve of the same radius as that of the curved portion of the tool to be held thereby. As shown in Fig. 3 a cutting tool 15 of the usual type is in position on the work wheel 9, being held thereto by a headed bolt 16 engaging the shank of the tool 15 coming through the said shank, and with the threaded portion of said bolt engaging a tapped recess 17 in the lug 10. A similar headed bolt 18 engages a tapped recess in the lug 11, so that the knife 15 could be held in reversed position from that shown in Fig. 3, on the lug 11. Fast and loose pulleys 19 and 20 respectively are fitted on the shaft 8, said shaft being intended to be rotated at a relatively slow speed.

On the arm 3 is mounted a small electric motor 21 carrying the spindle 22 which has clamped near its end the grinder 23. This motor is mounted on a longitudinal slide 25, adapted to be fed toward and from the work holder 9 and slideways 26 and 27 by rotation of the hand wheel 28 turning the adjusting screw 29 in well-known manner. A transverse or cross-wise movement is also given to the motor by mounting the longitudinal carrier to slide transversely on the rods 32 and 33, being moved this way by the screw 34 rotated by the wheel 35 and handle 36, this being a wellknown and ordinary construction for longitudinal and transverse adjustments.

In the operation of the apparatus, the wheel 28 is manipulated by the handle 30 to withdraw the carriage holding the motor 25 and the spindle 22 from immediate contact with the work holder 9. A knife 15 to be ground is then applied to the work holder and adjusted with its curved portion in contact with the inner curved surface of the lug 11, as herein shown.

The work holder 9 is then thrown into rotation by shifting the driving belt from the loose to the fast pulley, said work holder rotating at relatively slow speed. The motor 21 which is now in operation rotating the spindle 22 and grinder 23 at high speed, preferably twelve to eighteen hundred R. P. M., is then moved forwardly by rotation of the feeding screw 29 and if desired moved laterally by manipulation of the side feeding screw 34, until the grinder engages the knife, whereupon it is held in engagement until the grinding operation is completed. Rotation of the work holder around the grinder forms the bevel around the entire surface of the cutting edge of the tool 15. It will be noted that it is necessary to have the grinder 23 of slightly less diameter than that of the curve in which the tool 14 is formed and in my machine, said grinder may vary considerable in size, as it is worn away, before it must be replaced by a new grinding medium. When so replaced, the threaded nuts 39 and 40, which clamp the grinder 23 between them, are adjustably threaded onto the end of the spindle 22 and are readily removed for changing the grinder, a lock nut 41 on the end being provided. It will be noted that exactly the same bevel entirely around the cutting edge of the tool 15 is automatically formed and this bevel and edge is exactly reproduced on every succeeding tool ground thereon. By the rotation of the work holder, the edge of the cutter is prevented from having one point in contact with the grinding medium long enough to cause any damage, as by burning, or by gouging or otherwise distorting the edge. Furthermore, the steel being thus kept in motion and constantly cooled, the grinder can be rotated at very high speed, and thus acts more efficiently.

The exact position in which this grinder and work holder are arranged, furthermore, insures that the grinding edge of the cutter shall be at all times parallel with the original cutting edge and consequently parallel with the back of the knife. No matter how much the knife is ground down, the edge is always maintained true and thus parallel, which result is of great importance and is believed to be a distinct novelty in this art.

My invention is further described and defined in the form of claims as follows:

1. A grinding machine of the kind described, adapted to operate on the curved cutting edge of a tool, a support having two arms extending at a predetermined angle with each other, a rotatable work holding member carried on one of said arms, an electric motor operating a rotatable spindle carried on the other of said arms, said work holder and spindle having the same predetermined fixed angle relatively with each other as the angle of said arms on the support, means on the work holder to hold the knife to be ground, and means to move the grinding medium longitudinally and laterally toward and from said knife while maintaining the grinding medium at the same fixed relative angle.

2. A grinding machine of the kind described, comprising a rotatable work holder, a tool retaining lug on said work holder having a curved portion adapted to receive and hold the correspondingly curved portion of a cutting tool to be ground, a grinding medium adapted to be rotated at high speed and means to hold said grinding medium at a predetermined fixed angle with regard to the edge of the tool to be ground, said grinding medium having a diameter less than that of the curved edge of said tool, and means to move the medium and tool toward and from each other at said predetermined fixed angle, whereby the beveled face ground on the tool will be at the same angle as that of the axis of the grinder with the axis of the work holder.

In testimony whereof I have signed my name to this specification.

FRED H. LINDSAY.